United States Patent
Candy et al.

(10) Patent No.: US 11,495,243 B2
(45) Date of Patent: Nov. 8, 2022

(54) LOCALIZATION BASED ON TIME-REVERSED EVENT SOUNDS

(71) Applicant: Lawrence Livermore National Security, LLC, Livermore, CA (US)

(72) Inventors: Jim Candy, Danville, CA (US); Karl A. Fisher, Brentwood, CA (US); Christopher Roland Candy, San Ramon, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 172 days.

(21) Appl. No.: 16/943,250

(22) Filed: Jul. 30, 2020

(65) Prior Publication Data

US 2022/0036913 A1    Feb. 3, 2022

(51) Int. Cl.
| | | |
|---|---|---|
| *G10L 25/48* | (2013.01) | |
| *G10L 21/04* | (2013.01) | |
| *H04W 4/02* | (2018.01) | |
| *H04L 5/00* | (2006.01) | |
| *H04L 65/70* | (2022.01) | |
| *H04L 65/75* | (2022.01) | |

(52) U.S. Cl.
CPC .............. *G10L 25/48* (2013.01); *G10L 21/04* (2013.01); *H04L 5/0048* (2013.01); *H04L 65/70* (2022.05); *H04L 65/75* (2022.05); *H04W 4/02* (2013.01)

(58) Field of Classification Search
None
See application file for complete search history.

(56) References Cited

U.S. PATENT DOCUMENTS

| | | | |
|---|---|---|---|
| 7,460,605 B2 | 12/2008 | Candy et al. | |
| 10,134,422 B2 * | 11/2018 | Hwang | G01S 5/28 |
| 10,380,881 B2 * | 8/2019 | Xu | G08B 13/181 |

(Continued)

FOREIGN PATENT DOCUMENTS

| | | |
|---|---|---|
| KR | 20130109362 A | 10/2013 |
| WO | 2009124772 A1 | 10/2009 |

OTHER PUBLICATIONS

International Search Report and Written Opinion received in International Application No. PCT/US21/42415, dated Nov. 10, 2021, 13 pages.

(Continued)

*Primary Examiner* — Shaun Roberts
(74) *Attorney, Agent, or Firm* — Perkins Coie LLP

(57) ABSTRACT

A system determines an event location of an event within an indoor environment based on an event sound generated by the event. The system employs time-reversal techniques based on a received event sound to identify the event location as being in the vicinity of one of a plurality of locator devices at locator locations in the environment. The system includes a base array located within the environment that receives an indication that an event has been detected. Upon receiving the event sound, the system generates a time-reversed event sound for each transceiver and transmits via each transceiver the time-reversed event sound for that transceiver. When a locator device receives a time-reversed event sound, the locator device determines whether the event is in the vicinity of that locator location of the locator device and, if so, outputs an indication that the event occurred at that locator location.

22 Claims, 11 Drawing Sheets

(56) References Cited

U.S. PATENT DOCUMENTS

| | | | |
|---|---|---|---|
| 10,657,800 B1 | 5/2020 | Fowler et al. | |
| 2010/0005362 A1* | 1/2010 | Ito | G10L 19/005 |
| | | | 714/752 |
| 2011/0103612 A1* | 5/2011 | Chou | H04N 7/15 |
| | | | 381/92 |
| 2011/0103620 A1* | 5/2011 | Strauss | H04S 7/303 |
| | | | 381/150 |
| 2016/0018508 A1 | 1/2016 | Chen et al. | |
| 2016/0061929 A1* | 3/2016 | Wu | G01S 3/8006 |
| | | | 367/124 |
| 2019/0114888 A1 | 4/2019 | Wei et al. | |
| 2019/0180606 A1* | 6/2019 | Pirkle | H04R 1/406 |
| 2019/0310357 A1* | 10/2019 | Davis | G06F 1/1616 |

OTHER PUBLICATIONS

Candy, V., J., et al., "Time-reversal processing for an acoustic communications experiment in a highly reverberant environment," J. Acoust. Soc. Am. 115 (4), Apr. 2004.

Prada, C., et al., "Experimental subwavelength localization of scatterers by decomposition of the time reversal operator interpreted as a covariance matrix," J. Acoust. Soc. Am. 114 (1), Jul. 2003.

Chambers, D. H., et al., "Time-reversal and the spatio-temporal matched-filter," J. Acoust. Soc. Am., 115, (6), p. 3095-3110, (2004).

Naguib, A. F., et al., "Increasing data rate over wireless channels," in IEEE Signal Processing Magazine, vol. 17, No. 3, pp. 76-92, May 2000, doi: 10.1109/79.841731.

Blomgren, P., et al., "Super-resolution in time-reversal acoustics", J. Acoust. Soc. Am., 111, (1), p. 230-248, (2002), 20 pages.

Brienzo, R. K, et al., "Broadband matched-field processing", J. Acoust. Soc. Am., 94, (5), p. 2821-2831, (1993), 12 pages, Nov. 1993.

Candy, J. V, et al., "Multichannel time-reversal processing for acoustic communications in a highly reverberant environment", J. Acoust. Soc. Am., 118, (4), p. 2339-2354, (2005), 17 pages, Oct. 2005.

Candy, J. V, et al., "Wideband multichannel time-reversal processing for acoustic communications in highly reverberant environments", J. Acoust. Soc. Am., 120, (2), p. 838-851, K2006), 15 pages., Aug. 2006.

Derode, A., et al., "Taking Advantage of Multiple Scattering to Communicate with Time-Reversal Antennas", Phys. Rev. Ltrs., vol. 90, No. 1, p. 014301-1 to 014301-4, (2003), 4 pages.

Dowling, D. R, "Acoustic pulse compression using passive phase-conjugate processing", J. Acoust. Soc. Am., 95, (3), p. 1450-1458, (1994), 10 pages., Mar. 1994.

Edelmann, G. F, et al., "An initial demonstration of underwater acoustic communication using time reversal", IEEE J. Oceanic Engr., vol. 27, No. 3, p. 602-609, (2002), 8 pages., Jul. 2002.

Edelmann, G. F, et al., "Combining and comparing time reversal processing and adaptive channel equalization for communication sequences", J. Acoust. Soc. Am. 112, 2447 (2002), 2 pages., 2002.

Fink, M., et al., "Acoustic time reversal mirrors", Inverse Problems, 17, R1-R38, (2001), 38 pages.

Fink, M., "Time reversal in acoustics", Contemporary Physics., vol. 37, (2) pp. 95-109, (1996), 16 pages.

Folegot, T., et al., "Adaptive instant record signals applied to shallow water detection", J. Acoust. Soc. Am. 115, 2468 (2004), 3 pages.

Folegot, T., et al., "Using acoustic orthogonal signals in shallow water time-reversal applications", J. Acoust. Soc. Am. 115, 2468 (2004), 3 pages.

Heinemann, M., et al., "Experimental studies of applications of time-reversal acoustics to noncoherent underwater communications", J. Acoust. Soc. Am., 113, (6), p. 3111-3116, (2003), 7 pages.

Hermand, J-P., et al., "Acoustic model-based matched filter processing for fading time-dispersive ocean channels: Theory and experiment", IEEE J. Oceanic Engr., vol. 18, No. 4, p. 447-465, (1993), 19 pages.

Hermand, J-P., "Broad-band geoacoustic inversion in shallow water from waveguide impulse Yesponse measurements on a single hydrophone: theory and experimental results", IEEE J. Oceanic Engr., vol. 24, No. 1, p. 41-66, (1999), 26 pages.

Hodgkiss, W. S, et al., "A long-range and variable focus phase-conjugation experiment in shallow water", J. Acoust. Soc. Am., 105, (3), p. 1597-1604, (1999), 9 pages., Mar. 1999.

Jackson, D. R, et al., "Phase conjugation in underwater acoustics", J. Acoust. Soc. Am., 89, (1), p. 171-181, (1991), 12 pages., Jan. 1991.

Kuperman, W. A, et al., "Phase conjugation in the ocean: Experimental demonstration of an acoustic time-reversal mirror", J. Acoust. Soc. Am., 103, (1), p. 25-40, (1998), 17 pages., Jan. 1998.

Li, X., et al., "Contributed Review: Source-localization algorithms and applications using time of arrival and time difference of arrival measurements", Rev. Sci. Instrum., 87,p. 041502-1:12, (2016), 12 pages.

Luzi, L., et al., "Acoustic firearm discharge detection and classification in an enclosed environment", J. Acoust. Soc. Am., 139 (5), p. 2723-2731, (2016), 10 pages.

Maher, R. C, "Acoustic characterization of gunshots", IEEE Safe Workshop., Wash. DC, p. 109-113, (2007), 5 pages., 2007.

Maher, R. C, "Audio forensic examination", IEEE Signal Proc. Magz., p. 84-94, (2009), 11 pages., Mar. 2009.

Maher, R. C, et al., "Deciphering gunshot recordings", AES 33rd Internal. Confr., Denver, CO, (2008), 8 pages., Jun. 2008.

Papanicolau, G., "Remote sensing and communications in random media", J. Acoust. Soc. Am. 113, 2212 (2003), 2 pages.

Parvulescu, A., "Matched-signal (MESS) processing by the ocean", J. Acoust. Soc. Am., 98, (2), p. 943-960, (1995), 18 pages.

Paulraj, A. J, et al., "Space-time processing for wireless communications", IEEE Signal Processing Magazine, vol. 14, No. 6, pp. 49-83, (1997), 35 pages., Nov. 1997.

Root, J. A, et al., "Performance of an underwater acoustic vol. array using time-reversal focusing", J. Acoust. Soc. Am. 112, 1869 (2002), 11 pages., Nov. 2002.

Rouseff, D., et al., "Underwater acoustic communication by passive-phase conjugation: theory and experiment", IEEE J. Oceanic Engr., vol. 26, No. 4, p. 821-831, (2001), 11 pages.

Siegel, P. H, "Terahertz Technology", IEEE Trans. Microwave Th. and Techn., 50, 3, (2002), 19 pages., Mar. 2002.

Smith, K. B, et al., "Examination of time-reversal acoustics in shallow water and applications to noncoherent underwater communications", J. Acoust. Soc. Am., 113, (6), p. 3095-3110, (2003), 17 pages., Jun. 2003.

Song, H., et al., "Simultaneously multiple-depth coherent communications using time reversal", J. Acoust. Soc. Am. 115, 2467 (2004), 2 pages.

Tanter, M., et al., "Time-reversal and the inverse filter", J. Acoust. Soc. Am., 108 p. 223-234, (2000), 13 pages.

Yang, T. C, "Performance comparisons between passive-phase conjugation and decision-feedback equalizer for underwater acoustic communications", J. Acoust. Soc. Am. 115, 2505 (2004), 3 pages., 2004.

Yon, S., et al., "Sound focusing in rooms: The time-reversal approach", J. Acoust. Soc. Am., 113, (3), p. 1533-1543, (2003), 12 pages.

* cited by examiner

LOCALIZATION BASED ON TIME-REVERSED EVENT SOUNDS

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Active shooter incidents have become increasingly common, especially in the United States. The Federal Bureau of Investigation reports that there have been several hundred active shooter incidents since 2000. These incidents have occurred at schools, malls, churches, theaters, and so on. The damage, including the death toll and emotional pain caused from these incidents, is immeasurable.

Attempts have been made to help first responders more effectively respond to these incidents in real time. One example is the development of technology to both detect that an incident is occurring and to identify the location of the shooter—referred to as a detection/localization system. A variety of detection/localization systems have been deployed throughout the United States to detect and locate shooters who are outdoors. Unfortunately, there has not been an effective detection/localization system for shooters who are indoors. A primary problem with detection/localization indoors is that sound propagating in enclosed spaces creates a unique problem because of inherent obstructions causing transmitted sounds or signals to bounce (reflect), bend (refract), and spread (disperse) in many directions, distorting both their shape and their amplitudes. As a result, arrival times at receiver locations make simple triangularization techniques (as in outdoor processing) very challenging and usually erroneous.

Schools and hospitals are examples of environments that present challenges for detection/localization. A typical public high school has many classrooms and meeting rooms connected to intersecting hallways. The rooms have different shapes, heights, content, and so on depending on their purpose (e.g., lunchroom, chemistry lab, or library). The hallways may have different characteristics at their intersections and may have different content (e.g., lockers, bookshelves). A hospital environment is even more complex because equipment is frequently moved from room to room, stored in hallways, and so on. Because sound from the firearm of an active shooter follows multiple paths through such environments, localization is a difficult problem. It would be desirable to have a localization system that could effectively and reliably localize in real time an active shooter in such indoor environments so that first responders can neutralize the active shooter incident.

DETAILED DESCRIPTION

Figure 1:
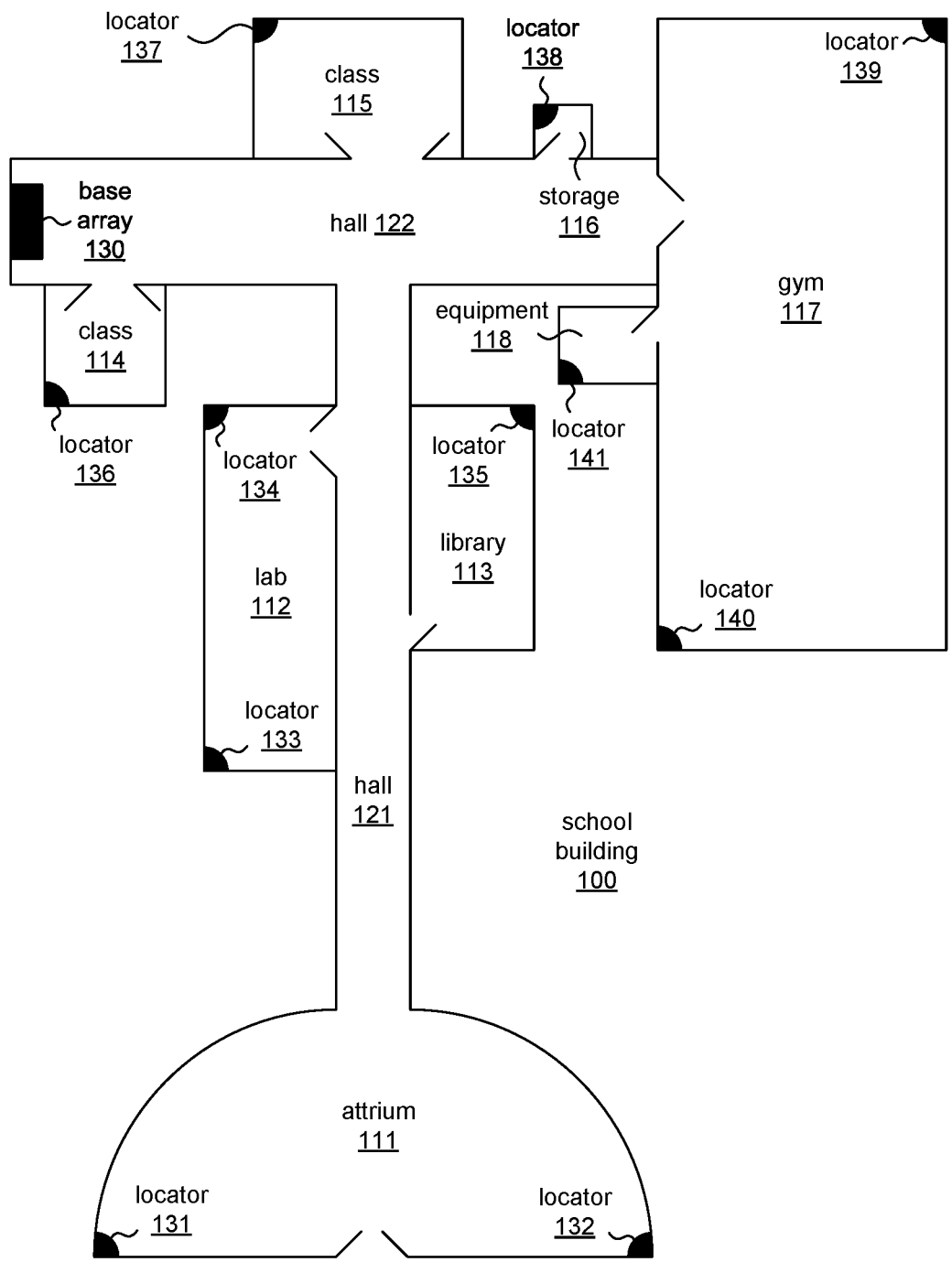
FIG. 1 is a block diagram of an example school building environment in which the TRL system operates.

Methods and systems are provided for determining within an environment the event location of an event (e.g., gunshot) based on receiving the event sound and time-reversal (T/R) processing of the event sound. In some embodiments, a T/R localization (TRL) system employs a base array that includes base array (BA) transceivers and employs locators at locator locations throughout the environment. For example, the environment may be a school building with a base array located in a hallway and a locator located in each classroom and at various hallway locations. The TRL system also includes a base array component (e.g., software) and a locator component that control the operations of the base array and locator. The base array also includes a computing device to collect event sounds received by the BA transceivers, generate a time-reversed event sound that is encoded with localization information, and transmit via the BA transceivers the time-reversed event sound with the encoded localization information to the locators. The BA transceivers transmit the time-reversed event sounds simultaneously. Each locator includes a locator receiver for receiving time-reversed event sounds and a computing device for determining whether the localization information of the time-reversed event sound indicates that the event location is near the locator. If a locator makes that determination, the locator can take appropriate countermeasures, such as directing doors to be locked, authorities to be notified, lights to be strobed, and so on. The TRL system may employ a BA communicating component to implement this localization based on communicating localization information from the base array to the locators.

In some embodiments, the TRL system may employ a base array only, that is, one that does not interact with any locators. During a calibration phase prior to an event, pilot signals may be transmitted individually from each location within the environment. The pilot signal may have a signature (e.g., impulse) similar to that of an expected event sound. The TRL system receives the pilot signals via the BA transceivers, convolves the pilot signals with a time-reversed pilot signal, and stores the convolved pilot signals as a sound map of the environment in a database. For example, if the base array has 8 BA transceivers and there are 10 rooms, the TRL system stores 80 convolved pilot signals in association with the identifications of the locations from which each was transmitted. The pilot signal may be a chirp signal that covers a range of frequencies. After calibration, when an event occurs and an event sound is received by the base array, the TRL system convolves the event sound with the convolved pilot signals in the sound map to identify the closest matching convolved pilot signal. When the TRL system identifies the closest matching convolved pilot signal, it assumes that the event location is near the location associated with the matching convolved pilot signal and can take appropriate countermeasures. The TRL system may employ a T/R mapping component to implement localization based on a sound map and without the use of locators.

In some embodiments, the TRL system may employ a base array and locators that include locator transceivers. When an event occurs and the BA transceivers receive the event sound, the base array transmits the time-reversed event sound to the locators. When the locators receive that time-reversed event sound, the time-reversed event sound that is received by the locator near the event location will be unblurred, referred to as focused, based on having traveled in the reverse direction along the same paths as the event sound. The other locators will receive time-reversed event sounds that are not so focused because they traveled through paths different from that of the event sound. Each locator determines whether the time-reversed sound that it received might indicate that the event location is near it. If a locator determines that the event location is unlikely to be near it, it takes no further action. Otherwise, the locator transmits the received sound back to the base array as a locator sound. When the base array receives a locator sound from a locator, it generates and transmits a time-reversed sound of the locator sound. This process is continually repeated in what may be referred to as the base array catching a sound and pitching the time-reversed sound and a locator catching a time-reversed sound and pitching it back as a locator sound. This process is repeated until a locator determines that a received time-reversed sound satisfies a location detection criterion, indicating that the event location is near it. For example, the location detection criterion may be that the last few received time-reversed sounds are similar to each other and similar to the expected signature of an event sound. If so, the locator assumes that the event location is near it and can take appropriate countermeasures.

In some embodiments, a locator may include a local detection unit that includes a microphone, an accelerometer, and/or a light detector to detect when an event has occurred near it. The locators may be installed throughout an environment, for example, mounted on or in walls or ceilings in a way similar to a common motion detector for turning on lights. When an event occurs, the microphone measures the event sound, the accelerometer measures event movement in the mounting structure (e.g., wall), and the light detector (e.g., infrared light) measures event light. As a standalone unit, the locator may determine whether an event detection criterion is satisfied by the measurements. For example, the measurements may be converted to a probability with 0 indicating not an event and 1 indicating extremely likely to be an event. The event detection criterion threshold may be that if the sum of probabilities is greater than 2.4, then an event has occurred. The event detection criterion may have the probabilities weighted differently depending on the environment. For example, the weight for the measurement of the event sound may be low for a classroom because it is expected to be a noisy environment and high for a museum. When the event detection criterion is satisfied, the locator assumes that an event has occurred near it and can take appropriate countermeasures. The local detection unit may also be used in conjunction with a base array to further help in identifying the location of the event. In such a case, the locator may use the localization information or the location detection criterion as another factor for the event detection criterion.

In some embodiments, the TRL system initiates the localization process based on receiving a detection notification from a detection unit indicating that an event has been detected. The detection unit may be part of or near the base array. In such a case, the detection unit may continually analyze sounds that it receives to determine whether they represent an event sound (e.g., sound from different types of guns or different types of explosions). For example, the analysis may be based on sound signatures of the type of events to be detected. The detection processing may, alternatively or in addition, be performed by local detection units located through the environment. When a local detection unit detects an event sound, it sends a detection notification to the base array.

The TRL system may be employed to track the location of multiple events of the same event incident. For example, an event incident may be when a shooter moves throughout a building and fires a gun at different locations. Once the initial event has been detected and its event location identified, the TRL system can enter a mode to process subsequent sounds even without a subsequent event being detected. When the base array receives event sounds for subsequent events of that event incident, it processes the event sounds in a manner similar to the way it processed the initial event sound. Thus, if the subsequent events, for example, occur at event locations not near a detection unit and are not detected as events, the TRL system can still identify those event locations.

FIG. 1 is a block diagram of an example school building environment in which the TRL system operates. The environment is a school building 100 that includes rooms 111-118. The rooms include atrium 111, laboratory 112, library 113, classroom 114, classroom 115, storage area 116, gymnasium 117, and equipment room 118. The school building also includes hallway 121 and hallway 122. Each room is equipped with one or more locators 131-141. For example, atrium 111 is equipped with locators 131 and 132, and storage area 116 is equipped with locator 138. The school building is also equipped with base array 130 located at the end of hallway 122.

Because of the different paths, an event sound causes a time series of sound waves to be received by a BA transceiver. The first sound wave in the time series may have the highest amplitude, the second sound wave may have a smaller amplitude, and so on. The TRL system uses time reversal to generate a time-reversed event sound. A time-reversed event sound is the sound waves of the event in reverse order, that is, the last received sound wave is the first and the first received sound wave is the last in the time-reversed event sound. The multiple paths from an event location may be considered to be a blurring of the event sound. The transmitting of the time-reversed event sound may be considered to be an unblurring of the event sound. When a locator near the event location receives the time-reversed event sound, it should be somewhat unblurred and should have a signature similar (albeit with reduced amplitude) to that of the original event sound.

Figure 2:
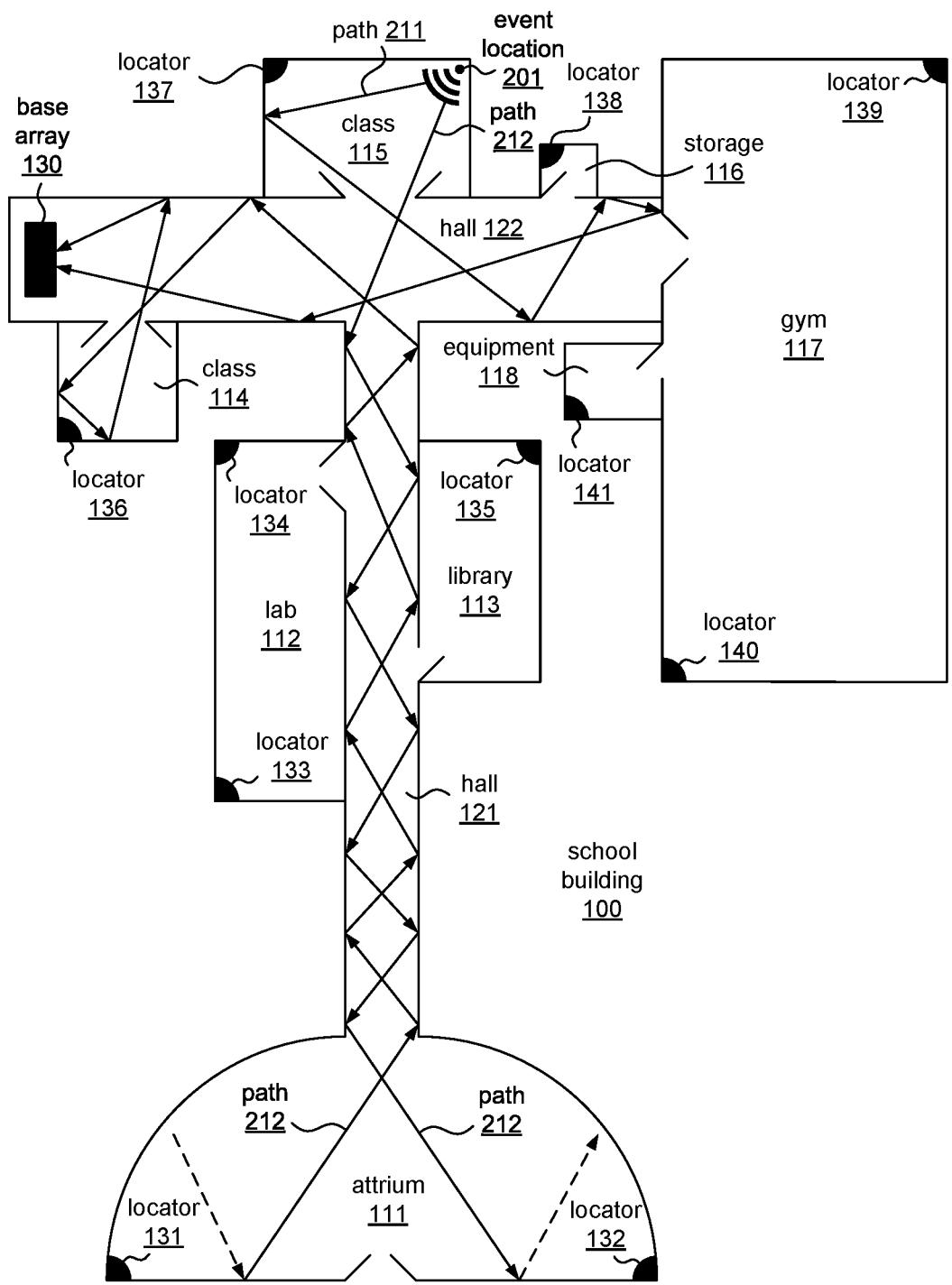
FIG. 2 is a block diagram that illustrates multiple paths of an event sound in the example school building environment.

FIG. 2 is a block diagram that illustrates multiple paths of an event sound in the example school building environment. The event occurs at event location 201, and the event sound is illustrated as traveling along path 211 and path 212—although it would likely travel along many more paths. The event sound travels along path 211, bouncing off a wall in classroom 115, exiting classroom 115, bouncing along hallway 122, and then impacting base array 130. The event sound travels along path 212, exiting classroom 115, bouncing down hallway 121, reverberating around atrium 111, exiting atrium 111, bouncing up hallway 121, entering hallway 122, entering and then exiting classroom 114, reentering hallway 122, and then impacting base array 130. (Note: The depicted angles of the paths are for illustration only and do not represent the actual angles of the paths.) Because path 212 is longer than path 211, the event sound traveling along path 211 will reach the base array before the event sound traveling along path 212. Moreover, because path 211 is shorter, the event sound that travels on path 211 will likely have, when it impacts the base array, a greater amplitude than the event sound that travels along path 212. The amplitude, however, depends in part on the surfaces that the event sound is reflected off of. For example, if the hallway 122 has sound-absorbing walls, then the amplitude of the event sound traveling along path 211 may be less than the amplitude of the event sound traveling along path 212. Although not shown, the paths that the event sounds travel are affected by the content of the rooms and hallways. For example, a library may have shelves that cause the event sound to reverberate in the library along many different paths before exiting the library. As another example, one of the doors on the laboratory 112 may be closed, limiting the number of paths that can exit the laboratory.

Figure 3:
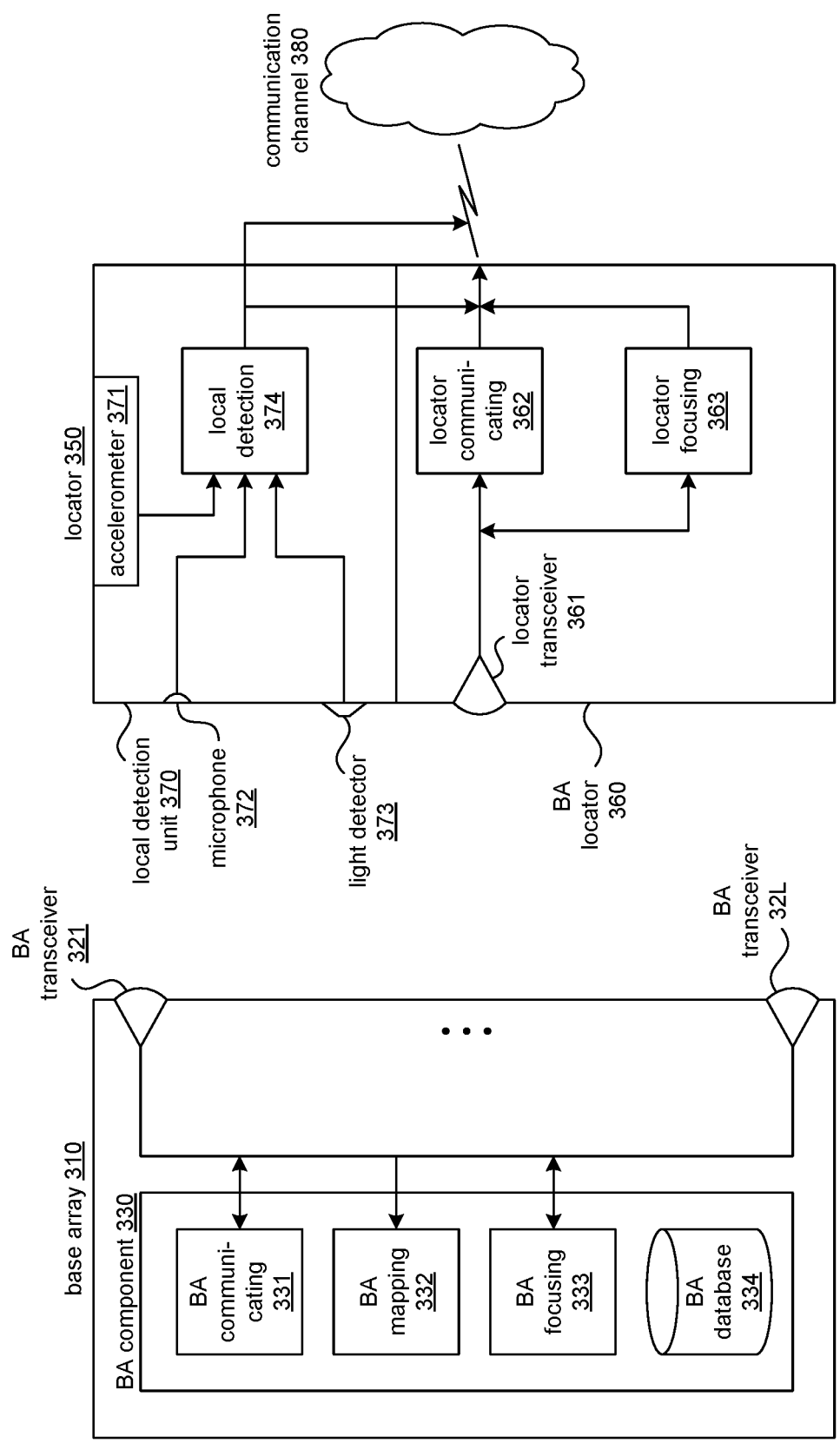
FIG. 3 is a block diagram that illustrates the overall architecture of a base array and a locator.

FIG. 3 is a block diagram that illustrates the overall architecture of a base array and a locator. A base array 310 includes BA transceivers 321-32L and BA component 330, where L is the number of transceivers. As used herein, "transceiver" refers to either a receiver and a transmitter that are integrated or a separate receiver and transmitter. Also, when the T/R mapping is used, the base array need only include receivers because, at least in one embodiment, it does not transmit to locators. The BA component includes a BA communicating component 331, a BA mapping component 332, and a BA focusing component 333. The BA component also includes a BA database 334 that stores information used by the BA component, such as a sound map generated during a calibration phase, identifiers of locators, and so on. A locator 350 may include a BA locator 360. The BA locator is used in conjunction with a base array. The BA locator includes a locator transceiver 361, a locator communicating component 362, and a locator focusing component 363. The BA locator communicates with communications channel 380 to direct countermeasures. The locator communicating component receives data transmitted by the BA communicating component, and the locator focusing component receives data transmitted by the BA communicating component and transmits data to the BA communicating component. The locator 350 may also include a local detection unit 370. The local detection unit includes an accelerometer 371, a microphone 372, and a light detector 373 that are connected to a local detection component 374. The local detection component processes inputs from the accelerometer, microphone, and light detector and determines whether an event has occurred nearby. The local detection component is connected to communications channel 380 to direct countermeasures.

The computing systems (e.g., nodes) on which the TRL system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media (or mediums) and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the TRL system. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The TRL system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the TRL system may be implemented in hardware using, for example, an application-specific integrated circuit (ASIC) or field programmable gate array (FPGA).

A mathematical representation of the physics underlying time reversal of signals is described in U.S. Pat. No. 7,460,605, entitled "Time Reversal Communication System," issued on Dec. 2, 2008, with inventors J. Candy and A. Meyer, which is hereby incorporated by reference. In the following, a mathematical representation of the physics underlying the TRL system is presented using terminology similar to that of the '605 patent.

The BA communicating component sends localization information encoded in a time-reversed event sound that may be represented by the following equation:

$$x(t) = \hat{g}_m(-t) \otimes i(t) = \begin{bmatrix} \hat{g}_{m1}(-t) * i(t) \\ \vdots \\ \hat{g}_{mL}(-t) * i(t) \end{bmatrix}$$

where $\hat{g}_{ml}$ represents the Green's function, m represents one of 1 ... M locators, l represents 1 ... L BA transceivers, $\otimes$ represents the Kronecker convolution operator (element-by-element multiply) yielding an L×1 complex vector, −t represents time reversal of an event sound, i(t) represents the localization information that may be unique to a locator, and x(t) represents the time-reversed event sound encoded with localization information to be transmitted by the BA transceivers. The time-reversed event sound transmitted from the base array through the environment is represented by the following equation:

$$z_{i\hat{g}_m x}(t) = G(r;t) * x(t) = G(r;t) * (\hat{g}_m(-t) \otimes i(t))$$

where z represents the time-reversed event sound encoded with localization information for transmission x that is received by a locator m, r represents the BA transceivers, and G (r; t) represents an estimated Green's function for the transmission and is convolved with the time-reversed event sound encoded with the localization information representing transmission to the locators. The above equation can be rewritten in vector form, as represented by the following equation:

$$z_{i\hat{g}_m X}(t) = \begin{bmatrix} g_1^T(t) \\ \vdots \\ g_M^T(t) \end{bmatrix} * (\hat{g}_m(-t) \otimes i(t)) = \begin{bmatrix} \overline{C}_{g_1 \hat{g}_m} \\ \vdots \\ \overline{C}_{g_M \hat{g}_m} \end{bmatrix} \otimes i(t)$$

where the cross-correlations are defined by $$\overline{C}_{g_k \hat{g}_m}(t) = \sum_{\ell=1}^{L} C_{g_k \hat{g}_m}(\ell; t) \text{ for } C_{g_k \hat{g}_m}(\ell; t) = g_{k\ell} * \hat{g}_{m\ell}(t) \text{ and } k = 1, \cdots, M$$

The localization information received at the $k^{th}$ locator is represented by the following equation:

$$z_k(t) \equiv z_{i\hat{g}_m X}(k; t) = \overline{C}_{g_k \hat{g}_m}(t) * i(t).$$

In some embodiments, a BA mapping component generates a sound map of received pilot signals based on pilot signals (e.g., chirps) being transmitted from locations throughout an environment and received by the BA transceivers during a calibration phase. Upon receiving a pilot signal, the BA mapping component convolves the received pilot signal with a time-reversed pilot signal and stores the convolved pilot signal in association with the location from which it originated. When an event sound is received, the BA mapping component may employ an autocorrelation to identify the convolved pilot signal that best matches the received event sound.

The autocorrelation of a signal is the convolution with itself, time-reversed, as represented by the following equation:

$$C_{xx}(t) = x(t) * x(-t)$$

The BA mapping component convolves the received pilot signal $z_p(t)$ with the time-reversed pilot signal for the $l^{th}$ location, as represented by the following equation:

$$\hat{g}_l(r;t) = z_p(t) * p_l(-t) = [g_l(r;t) * p_l(t)] * p_l(-t) = g_l(r;t) * C_{pp}(l)$$

resulting in an estimated Green's function, as represented by the following equation:

$$\hat{g}(r;t) \approx g(r;t) \text{ for } C_{pp}(t) \rightarrow \delta(t).$$

After calibration, an event sound that is received may be represented by the following equation:

$$z(t) = g^T(t) * \delta(t)$$

where $\delta(t)$ represents the event sound. The BA mapping component convolves the received event sound with the estimated reversed Green's functions, as represented by the following equation:

$$R_{i\hat{g}_m R}(t) = z(t) * \hat{g}_m(-t) =$$
$$(g^T(t) * \delta(t)) * \hat{g}_m(-t) = (g^T(t) * \hat{g}_m(-t)) * \delta(t) \approx C_{\hat{g}_m g} \quad m = 1, \cdots, L$$

where $$R_{i\hat{g}_m R}(t) \in R^{L \times 1}$$

at the array.

Since an array of receivers are employed, a set of Green's functions is available for matched filtering for each location. The BA mapping component determines the location by determining the maximum signal-to-noise ratio (matched filter), as represented by the following equation:

$$\Gamma(\ell) = \max[C_{\hat{g}_m g}]\big|_{m=\ell} \quad m = 1, \cdots, L$$

The BA focusing component of the TRL system employs a technique in which the base array repeatedly time-reverses a sound that it just received and retransmits the time-reversed sound. Upon receiving a time-reversed sound, each locator transmits that sound, which is then received by the base array. As this transmission back and forth between the base array and locators is repeated after an event sound is detected, the effects of the environment (as represented by the Green's function) on transmitted sounds tend to distort sounds that follow paths other than that of the event sound and focus sounds that follow the path of the event sound.

The spatio-temporal propagation of an event sound $s(r_o, t)$ where the event location is $r_o$ and the time is t may be represented by the Green's function (impulse response) $G(r, r_o; t)$. A convolution of the Green's function and the event sound may be represented by the following equation:

$$R(r,t) = G(r,r_o;t) * s(r_o,t) \overset{F}{\Leftrightarrow} R(r,\omega) = G(r,r_o;\omega) S(r_o,\omega),$$

This equation may also be represented by an equivalent Fourier transform. Based on the underlying physics, the BA focusing component "retransmits" or "back-propagates," from the BA transceivers r to the locator near the event location $r_o$, time-reversed sound $R(r,-t)$, which can be represented by the following equation:

$$\hat{s}(r_o,t) = G(r_o,r;t) * R(r,-t) \overset{F}{\Leftrightarrow} \hat{S}(r_o,\omega) = G(r_o,r;\omega) R^*(r,\omega),$$

utilizing the Fourier transform conjugation property. By substituting the time-reversed sound into the equation representing the time-reversed event sound encoded with localization information (as described above) and invoking the reciprocity theorem $G(r_o, r; t) \equiv G(r, r_o; t)$ along with interchanging source and receiver positions, the sound received by the locator at the event location is represented by the following equation:

$$\hat{s}(r_o,t) = G(r_o,r;t) * G(r_o,r;-t) * s(r_o,-t) \overset{F}{\Leftrightarrow} (r,\omega) = |G(r,r_o;\omega)|^2 S^*(r_o,\omega),$$

This equation implies that the reversed sounds retransmitted through the environment will "focus" the enhanced energy (with gain K) back to the event location with no change in phase because of the magnitude-squared Green's function, as represented by the following equation:

$$\hat{S}(r_o,\omega) \propto K S(r_o,\omega),$$

When the time-reversed event sound is transmitted, the phase is not altered and the time-reversed sound refocuses back to the event location. In addition, knowledge of the Green's function is not required (no modeling).

When the base array receives a sound and generates and transmits the time-reversed sound and the locators receive and transmit the time-reversed sound (multiple pitch/reverse/catch sequences), the strongest "scatterer" (i.e., locator near the event location) survives while the weaker ones attenuate. The base array can selectively remove the weaker ones to focus on the event location.

Figure 4:
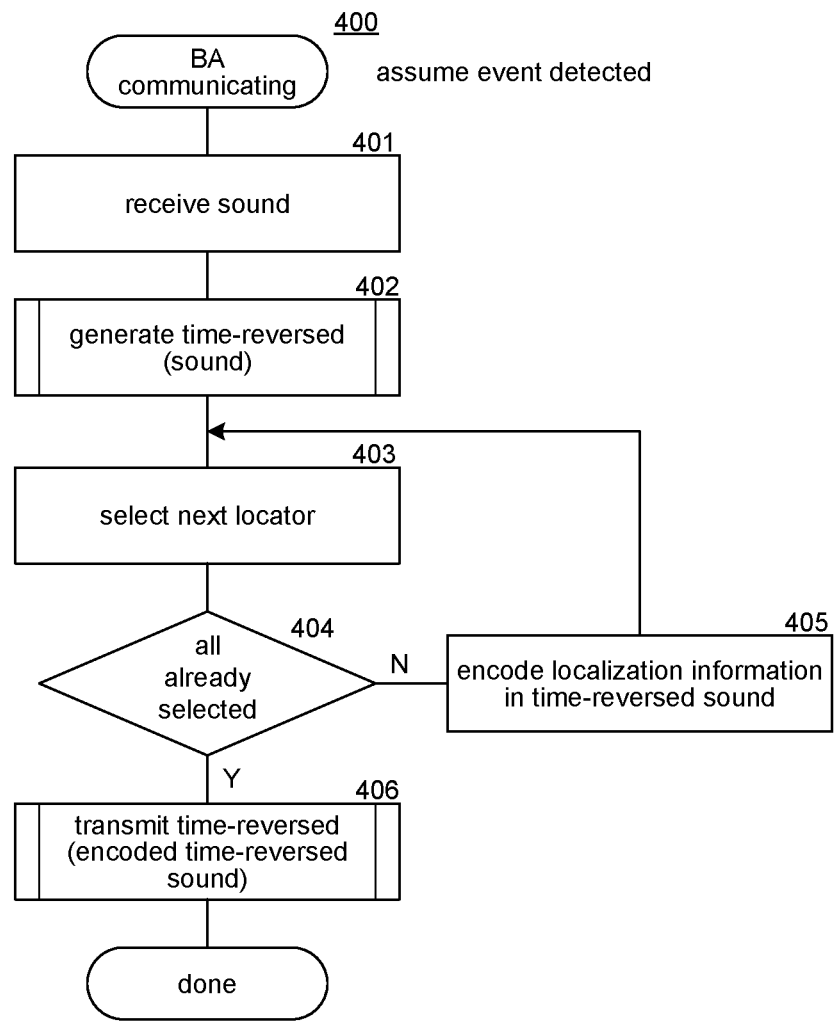
FIG. 4 is a flow diagram that illustrates the processing of a BA communicating component in some embodiments.

FIG. 4 is a flow diagram that illustrates the processing of a BA communicating component in some embodiments. The BA communicating component 400 is invoked when an event has been detected. In block 401, the component receives the event sound. In block 402, the component invokes a generate time-reversed component, passing the received sound, to generate the time-reversed sound. In block 403, the component selects the locators sequentially. In decision block 404, if all the locators have already been selected, then the component continues at block 406, else the component continues at block 405. In block 405, the component encodes localization information that is unique to the selected locator in the time-reversed sound and then continues to block 403 to select the next locator. In block 406, the component invokes the transmit time-reversed component to transmit the encoded time-reversed sound and then completes.

Figure 5:
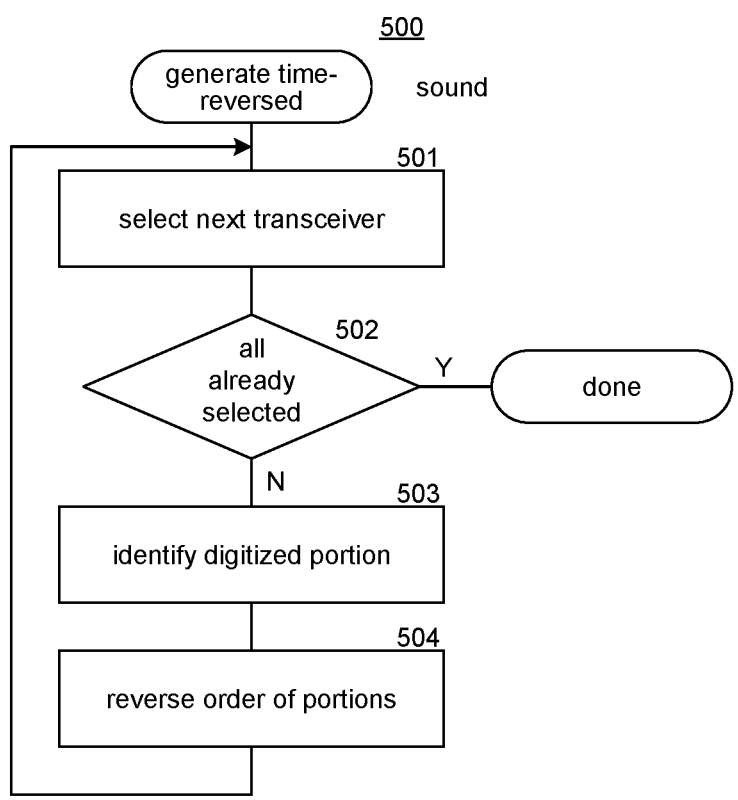
FIG. 5 is a flow diagram that illustrates the processing of the generate time-reversed component in some embodiments.

FIG. 5 is a flow diagram that illustrates the processing of the generate time-reversed component in some embodiments. The generate time-reversed component 500 is invoked, passing an indication of a sound, and generates a time-reversed sound. In block 501, the component sequentially selects each transceiver. In decision block 502, if all the transceivers have already been selected, then the component completes, indicating the time-reversed sound, else the component continues at block 503. In block 503, the component identifies portions of the event sound. In block 504, the component reverses the order of the portions to generate the time-reversed sound for the selected transceiver and then loops to block 501 to select the next transceiver.

Figure 6:
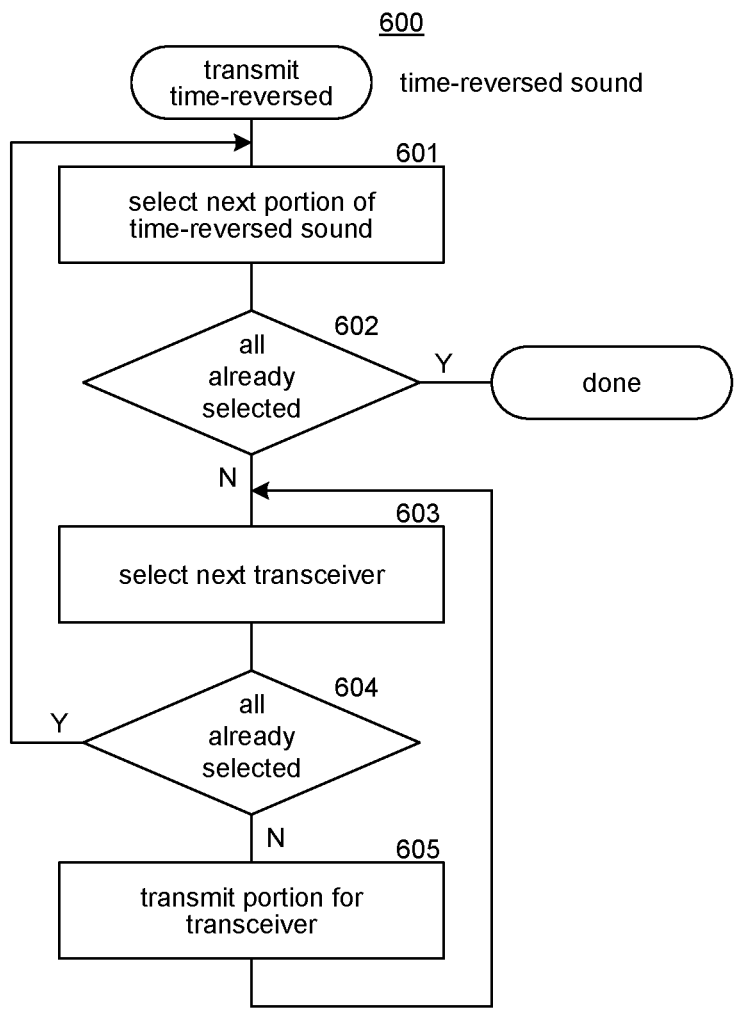
FIG. 6 is a flow diagram that illustrates the processing of the transmit time-reversed component in some embodiments.

FIG. 6 is a flow diagram that illustrates the processing of the transmit time-reversed component in some embodiments. The transmit time-reversed component 600 is passed a time-reversed sound and transmits that time-reversed sound to the locators. In block 601, the component selects the next portion of the time-reversed sound. In decision block 602, if all the portions have already been selected, then the component completes, else the component continues at block 603. In block 603, the component sequentially selects the transceivers. In decision block 604, if all the transceivers have already been selected, then the component loops to block 601 to select the next portion of the time-reversed sound, else the component continues at block 605. In block 605, the component transmits the portion via the transceiver and then loops to block 603 to select the next transceiver. The component transmits the portion to a transceiver in the sense that each portion is transmitted by all the BA transceivers simultaneously or nearly simultaneously and each portion is transmitted immediately after the prior portion is transmitted.

Figure 7:
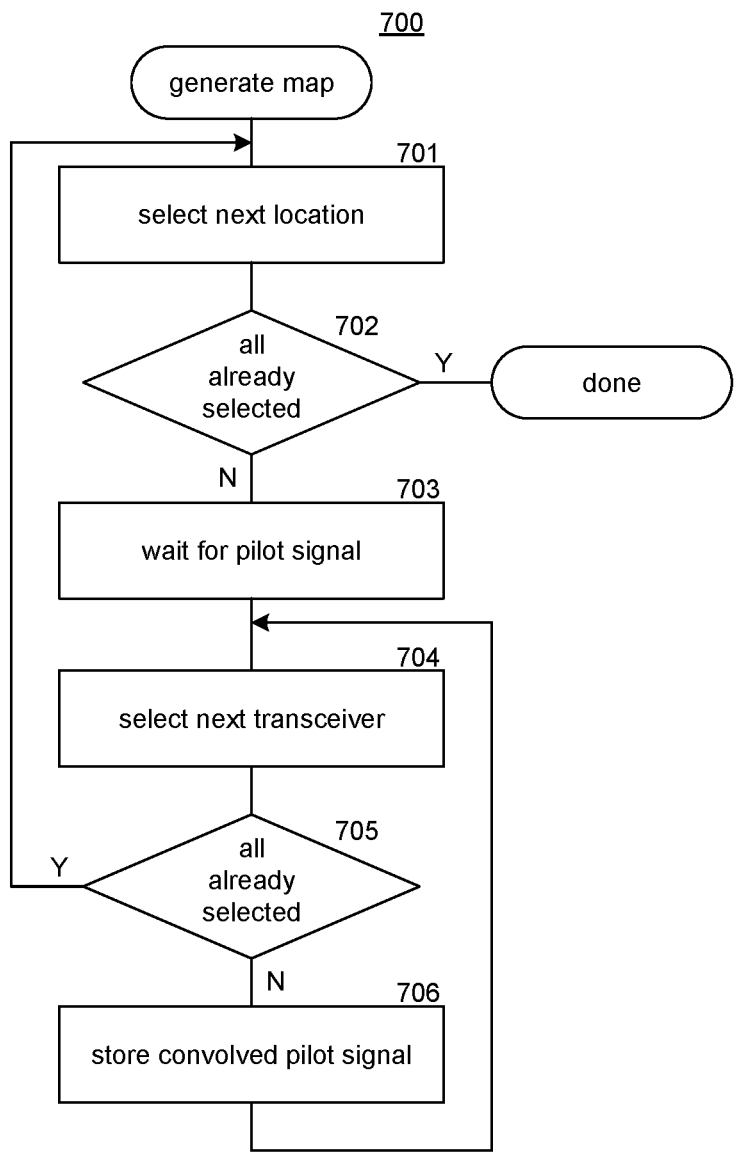
FIG. 7 is a flow diagram that illustrates the processing of a generate map component in some embodiments.

FIG. 7 is a flow diagram that illustrates the processing of a generate map component of the base array in some embodiments. The generate map component 700 generates a sound map based on pilot signals received at the base array. In block 701, the component sequentially selects each location from which a pilot signal is to be sent. In decision block 702, if all the locations have already been selected, then the component completes, else the component continues at block 703. In block 703, the component waits to receive a pilot signal that is sent from the selected location. In block 704, the component sequentially selects the BA transceivers. In decision block 705, if all the BA transceivers have already been selected, then the component loops to block 701 to select the next location, else the component continues at block 706. In block 706, the component convolves the received pilot signal with a time-reversed pilot signal and stores the convolved pilot signal in association with the selected location and then loops to block 704 to select the next BA transceiver.

Figure 8:
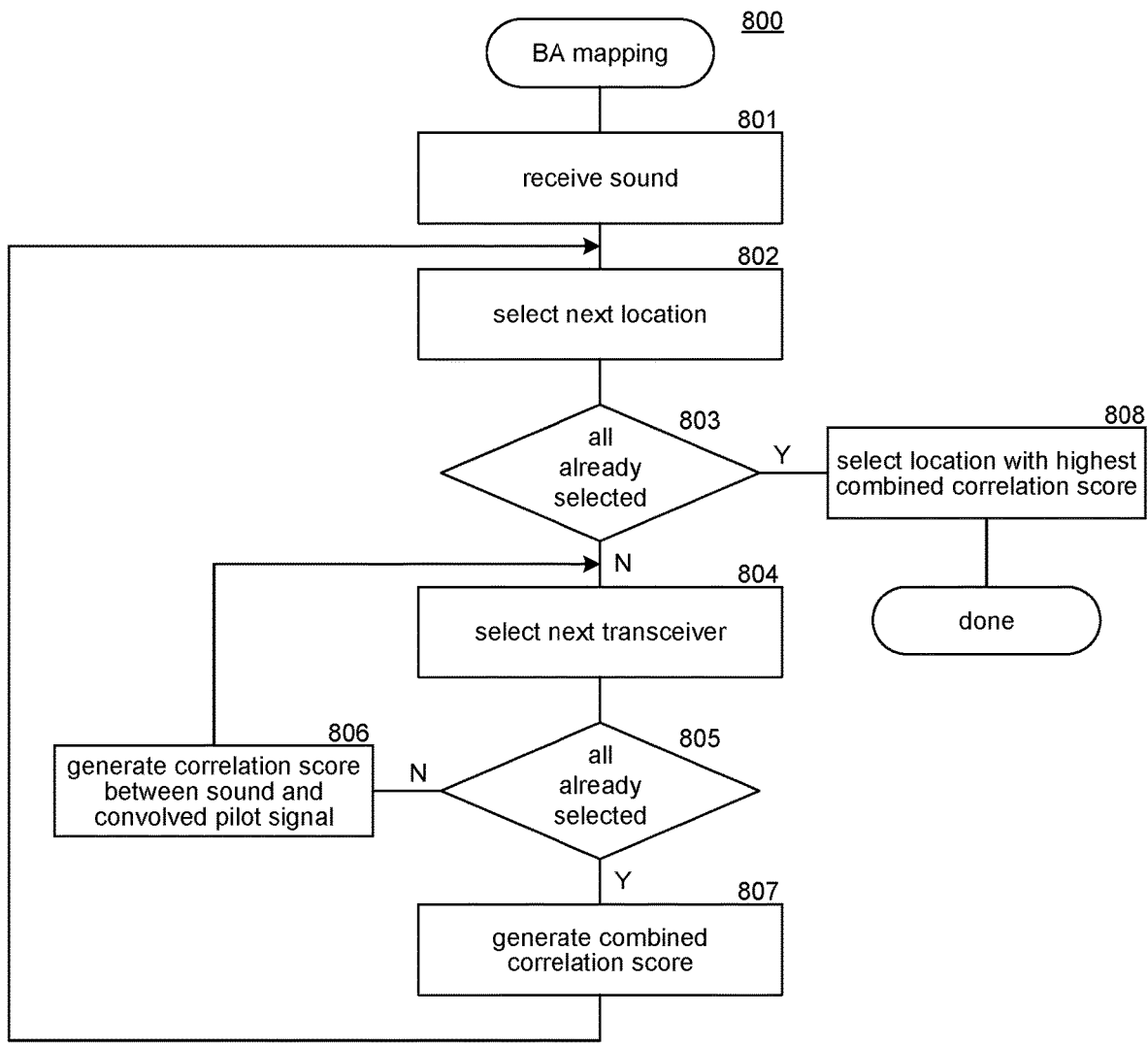
FIG. 8 is a flow diagram that illustrates the processing of a BA mapping component in some embodiments.

FIG. 8 is a flow diagram that illustrates the processing of a BA mapping component in some embodiments. The BA mapping component 800 is invoked to identify an event location based on comparing an event sound to a sound map of the environment. In block 801, the component receives an event sound. In block 802, the component sequentially selects the locations from which a pilot signal was sent during the calibration phase. In decision block 803, if all the locations have already been selected, then the component continues at block 808, else the component continues at block 804. In block 804, the component sequentially selects the BA transceivers. In decision block 805, if all the transceivers have already been selected, then the component continues at block 807, else the component continues at block 806. In block 806, the component generates a correlation score between the event sound received through the BA transceiver and the convolved pilot signal sound for that BA transceiver and then loops to block 804 to select the next BA transceiver. In block 807, the component generates a combined correlation score for the selected location and loops to block 802 to select the next location. In block 808, the component selects a location with the highest combined correlation score as the event location.

Figure 9:
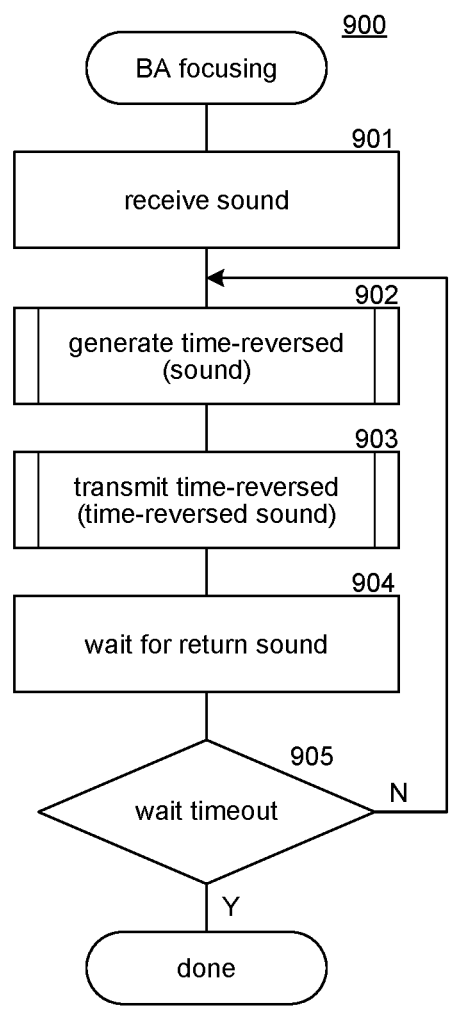
FIG. 9 is a flow diagram that illustrates the processing of a BA focusing component in some embodiments.

FIG. 9 is a flow diagram that illustrates the processing of a BA focusing component in some embodiments. The BA focusing component 900 is invoked to repeatedly receive sounds and transmit time-reversed sounds. In block 901, the component receives an event sound. In block 902, the component invokes the generate time-reversed component to generate a time-reversed sound for the last received sound. In block 903, the component transmits the time-reversed sound. In block 904, the component waits for the return sound. In decision block 905, if a wait timeout threshold is exceeded, then the component completes, else the component continues at block 902. The wait timeout threshold is exceeded when, for example, a locator determines that it is near the location event and all the other locators determine that they are not near the event location.

Figure 10:
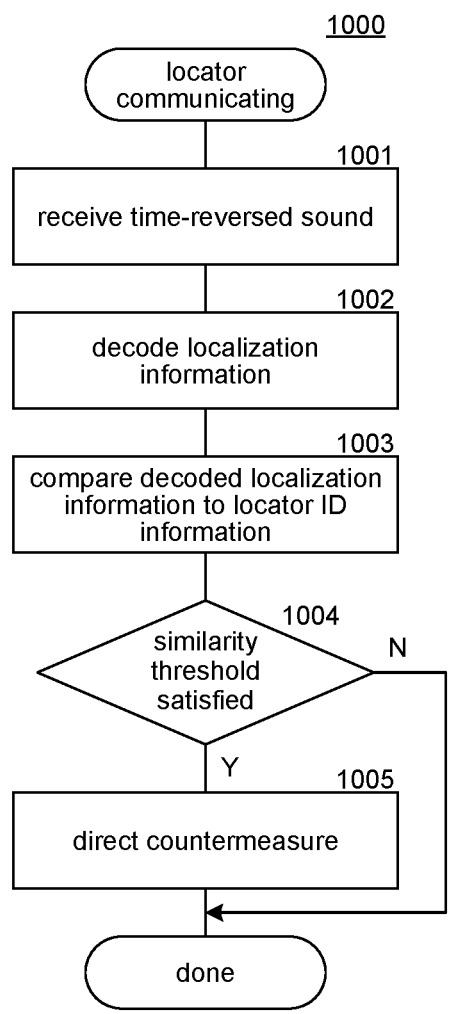
FIG. 10 is a flow diagram that illustrates the processing of a locator communicating component in some embodiments.

FIG. 10 is a flow diagram that illustrates the processing of a locator communicating component in some embodiments. The locator communicating component 1000 is invoked to determine whether a time-reversed sound that it receives includes its localization information. In block 1001, the component receives a time-reversed sound. In block 1002, the component decodes localization information in the time-reversed sound. In block 1003, the component compares the decoded localization information to the localization information for the locator. In decision block 1004, if the comparison indicates that a similarity threshold is satisfied, then the component continues at block 1005, else the component completes. In block 1005, the component directs a countermeasure and then completes.

Figure 11:
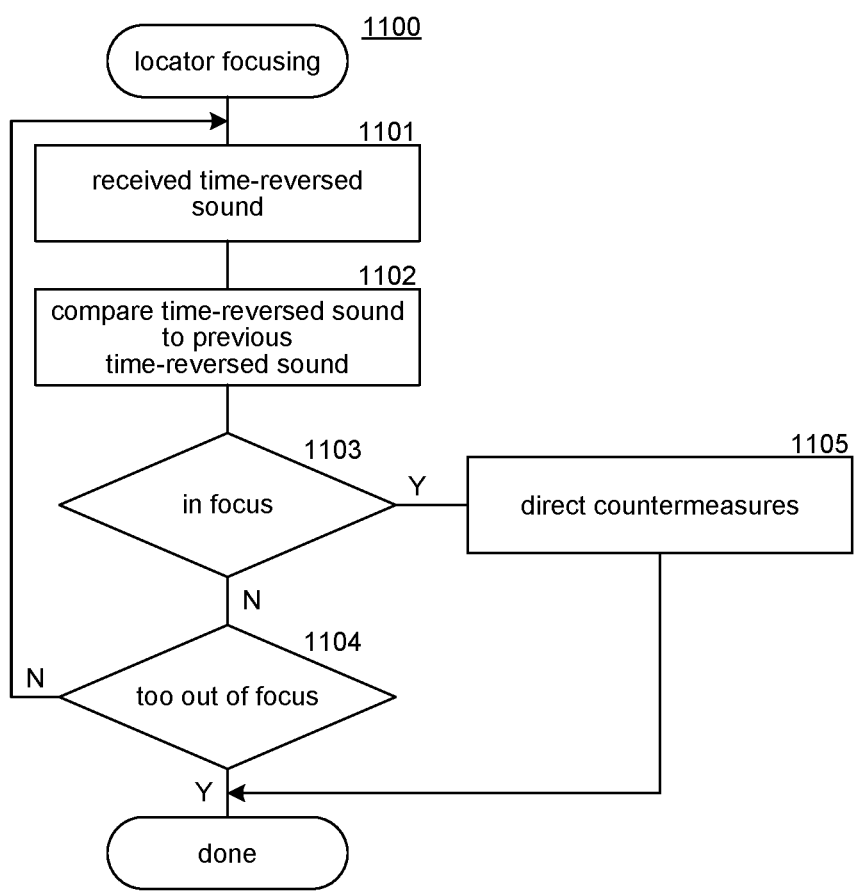
FIG. 11 is a flow diagram that illustrates the processing of a locator focusing component of a locator in some embodiments.

FIG. 11 is a flow diagram that illustrates the processing of a locator focusing component of a locator in some embodiments. The locator focusing component 1100 repeatedly receives time-reversed sounds and transmits those sounds. In block 1101, the component receives a time-reversed sound. In block 1102, the component compares the time-reversed sound to previous time-reversed sounds. In decision block 1103, if the comparison indicates that the time-reversed sounds are in focus, then the component continues at block 1105, else the component continues at block 1104. In decision block 1104, if the comparison indicates that the time-reversed sounds are too out of focus, then the component completes, else the component loops to block 1101 to receive the next time-reversed sound. In block 1105, the component directs countermeasures and then completes.

The following paragraphs describe various embodiments of aspects of the TRL system. An implementation of the TRL system may employ any combination of the embodiments. The processing described below may be performed by a computing device with a processor that executes computer-executable instructions stored on a computer-readable storage medium that implements the TRL system.

In some embodiments, a method performed by a device is provided for determining an event location of an event within an environment. The method receives, via transceivers of a base array of transceivers, an event sound generated by the event. The received event sound represents event sound that traveled on multiple paths through the environment from the event location to the base array. For each event sound received by a transceiver, the method generates a time-reversed event sound for the event sound received by that transceiver. The method encodes, into the time-reversed event sound for each transceiver, localization information that is unique to the locator. The method transmits, via the transceivers, the encoded time-reversed event sounds for the transceivers. In some embodiments, a locator that is near the event location recognizes its localization information in an encoded time-reversed event sound received by a receiver of the locator. In some embodiments, the received event sound has portions that are ordered from a first portion received to a last portion received and the generating of the time-reversed event sound orders the portions so that the last portion received is the first portion of the time-reversed event sound and the first portion received is the last portion of the time-reversed event sound. In some embodiments, the locators are located at various locations within the environment. In some embodiments, the environment is at least partially indoors.

In some embodiments, a method performed by a device is provided for determining an event location of an event within an environment. The method receives, via a receiver, an event sound generated by the event. The received event sound represents event sound that traveled on multiple paths through the environment from the event location to the receiver. The method generates an encoded time-reversed event sound for the received event sound, the encoded time-reversed event sound being encoded with localization information. The method transmits, via a transmitter, the encoded time-reversed event sound. In some embodiments, the event location is in the vicinity of a locator that recognizes the localization information in the encoded time-reversed event sound that is received by a receiver of the locator. In some embodiments, the received event sound has portions that are ordered from a first portion received to a last portion received and the generating of the encoded time-reversed event sound orders the portions so that the last portion received is the first portion of the encoded time-reversed event sound and the first portion received is the last portion of the encoded time-reversed event sound. In some embodiments, the environment is at least partially indoors. In some embodiments, the generating and transmitting are in response to determining that an event has been detected. In some embodiments, the method generates, for each of a plurality of locators, generates an encoded time-reversed event sound that is encoded with localization information unique to the locator and the transmitting transmits each encoded time-reversed event sound.

In some embodiments, one or more computing systems are provided for determining an event location of an event within an environment. The one or more computing systems includes one or more computer-readable storage mediums storing computer-executable instructions and one or more processors for executing the computer-executable instructions stored. The instructions for controlling the one or more computer systems to receive an event sound generated by the event, the received event sound representing event sound that traveled on multiple paths through the environment from the event location to a receiver. The instructions for controlling the one or more computer systems to generate an encoded time-reversed event sound for the received event sound, the encoded time-reversed event sound being encoded with localization information. The instructions for controlling the one or more computer systems to transmit the encoded time-reversed event sound. In some embodiments, the event location is in the vicinity of a locator that recognizes the localization information in the encoded time-reversed event sound that is received by the locator. In some embodiments, the received event sound has portions that are ordered from a first portion received to a last portion received and the generating of the encoded time-reversed event sound orders the portions so that the last portion received is the first portion of the encoded time-reversed event sound and the first portion received is the last portion of the encoded time-reversed event sound. In some embodiments, the environment is at least partially indoors. In some embodiments, the computer-executable instructions that generate and transmit the computer-executable instructions include instructions that control the one or more computing systems to generate, for each of a plurality of locators, an encoded time-reversed event sound that is encoded with localization information unique to the locator and to transmit each encoded time-reversed event sound.

In some embodiments, a method performed by a locator device is provided for determining an event location of an event within an environment, the locator device located at a locator location within the environment. The method receives an encoded time-reversed event sound that is encoded with localization information. The encoded time-reversed event sound is transmitted by a device that received an event sound generated by the event. The method compares the encoded time-reversed event sound to localization information that is unique to the locator device. When the comparison indicates a threshold similarity between the encoded time-reversed event sound to localization information that is unique to the locator device, the method indicates that the event location is near the locator device. In some embodiments, multiple locator devices are located at different locator locations within the environment, and each locator device has unique localization information. In some embodiments, the indicating includes directing the taking of a countermeasure. In some embodiments, the method further detects an occurrence of the event and transmitting an indication that the event has been detected.

In some embodiments, a locator device for determining an event location of an event within an environment. The locator device is located at a locator location within the environment. The locator device includes a receiver. The locator device includes one or more computer-readable storage mediums storing computer-executable instructions and one or more processors for executing the computer-executable instructions. The instructions are adapted to receive, via the receiver, an encoded time-reversed event sound that is encoded with localization information. The encoded time-reversed event sound transmitted by a device that received an event sound generated by the event. When the localization information of the encoded time-reversed event sound and localization information that is unique to the locator device satisfy a threshold similarity, the instructions are adapted to indicate that the event location is in the vicinity of the locator device. In some embodiments, multiple locator devices are located at different locator locations within the environment, and each locator device has unique localization information. In some embodiments, the instructions are adapted to direct the taking of a countermeasure. In some embodiments, the location devices include a transmitter, and the instructions are adapted to direct the taking of a countermeasure transmit, via the transmitter, an indication of the event location. In some embodiments, the instructions are adapted to detect an occurrence of the event and transmit an indication that the event has been detected. In some embodiments, the event is a gunshot.

In some embodiments, a method performed by one or more computing devices is provided for determining an event location of an event within an environment based on event sound generated by the event. The method accesses a sound map of the environment. The sound map is generated by transmitting pilot signals from locations within the environment, receiving the pilot signals by a base array of transceivers, and, for each transceiver, storing the pilot signals received by that transceiver in association with the locations from which the pilot signals were transmitted. The method receives at each transceiver the event sound generated by the event and for each location and transceiver, generates a correlation score based on the event sound received by the transceiver and the pilot signal of the sound map for that transceiver and that location. The method generates a combined correlation score for that location. The method indicates that the event location is the location with the highest combined correlation score. In some embodiments, the environment includes at least a section that is indoors. In some embodiments, multiple pilot signals are transmitted from each location and each of the multiple pilot signals has a different frequency. In some embodiments, the method transmits a notification that the event has occurred in the vicinity of the location with the highest combined correlation score. In some embodiments, the method directs the taking of a countermeasure based on the location with the highest combined correlation score.

In some embodiments, one or more computing devices fare provided or determining an event location of an event within an environment based on an event sound generated by the event. The one or more computing devices comprising one or more computer-readable storage mediums storing computer-executable instructions and one or more processors for executing the computer-executable instructions stored in the one or more computer-readable storage mediums. The instructions are adapted to control the one or one or more processors to access a sound map of the environment that maps pilot signals to locations within the environment from which the pilot signals were transmitted. The instructions are adapted to control the one or one or more processors to receive the event sound generated by the event. The instructions are adapted to control the one or one or more processors to generate a correlation score for that location based on the received event sound and the pilot signal of the sound map for that location. The instructions are adapted to control the one or one or more processors to output an indication that the event location is the location with the highest correlation score. In some embodiments, the environment includes at least a section that is indoors. In some embodiments, the event sound is received by multiple receivers and wherein the correlation score for a location is based on a combination of receiver correlation scores for that location. In some embodiments, multiple pilot signals are transmitted from each location and the multiple pilot signals transmitted from a location have different frequencies.

In some embodiments, a method performed by one or more computing devices for generating a sound map of an environment based on a pilot signal that is a sound. The method, for locations within the environment, transmits from that location the pilot signal, receives at receivers the transmitted pilot signal; and for each receiver, and stores an indication that the pilot signal received by the receiver is associated with that location. In some embodiments, multiple pilot signals with different frequencies are transmitted from each location and the storing stores an indication for each pilot signal transmitted from a location.

In some embodiments, a method performed by one or more computing devices for determining an event location of an event within an environment. For each of a plurality of sounds in sequence with an initial sound being an event sound of the event, the method receives via transceivers of a base array of transceivers sound that traveled on multiple paths through the environment from an originating location to the base array; for each sound received by a transceiver, generates a time-reversed sound of the sound received by that transceiver. The method transmits the time-reversed sounds via the transceivers. A locator device located at a locator location within the environment receives, via a receiver, the transmitted time-reversed sound and transmits, via a transmitter, the received time-reversed sound until the locator device determines that a received time-reversed sound is sufficiently focused to indicate that the event location is near the locator location. In some embodiments, the received sound has portions that are ordered from a first portion received to a last portion received and the generating of the time-reversed sound orders the portions so that the last portion received is the first portion of the time-reversed sound and the first portion received is the last portion of the time-reversed sound. In some embodiments, the environment is at least partially indoors. In some embodiments, the generating and transmitting are in response to determining that an event has been detected. In some embodiments, the method encodes localization information into the time-reversed sound prior to transmitting the time-reversed sound.

In some embodiments, one or more computing devices is provided for determining an event location of an event within an environment. The one or more computing devices include one or more computer-readable storage mediums storing computer-executable instructions and one or more processors for executing the computer-executable instructions stored in the one or more computer-readable storage mediums. The instructions adapted to, for each of a plurality of sounds in sequence with an initial sound being an event sound of the event, receive the sound representing sound that traveled on multiple paths through the environment from an originating location to a receiver; generate a time-reversed sound for the sound received by that receiver; and transmit the time-reversed sound. In some embodiments, a locator device located at a locator location within the environment receives, via a receiver, the transmitted time-reversed sound and transmits, via a transmitter, the received time-reversed sound until the locator device determines that a received time-reversed sound is sufficiently focused to indicate that the event location is near the locator location. In some embodiments, the received sound has portions that are ordered from a first portion received to a last portion received and the generating of the time-reversed sound orders the portions so that the last portion received is the first portion of the time-reversed sound and the first portion received is the last portion of the time-reversed sound. In some embodiments, the environment is at least partially indoors. In some embodiments, the time-reversed sound is generated and transmitted in response to determining that an event has been detected.

In some embodiments, one or more computing devices is provided for determining an event location of an event within an environment. The one or more computing devices associated with a transceiver located at a transceiver location within the environment. The one or more computing devices include one or more computer-readable storage mediums storing computer-executable instructions for controlling the one or more computing devices to, for each of a plurality of sounds received at the transceiver in sequence, compare the received sound to previously received sounds; transmit via the transceiver the received sound; and when the comparison indicates that the received sounds are approaching being in focus, identify the event location based on the transceiver location. The one or more computing devices include one or more processors for executing the computer-executable instructions stored in the one or more computer-readable storage mediums. In some embodiments, the instructions further, when the comparison indicates that the received sounds are not approaching being in focus, suppress the transmitting of the sound. In some embodiments, the instructions further, when the event location is identified, transmit a notification of the event location. IN some embodiments, a locator device for determining an event location of an event within an environment, the locator device at a locator location within the environment. The locator device includes input devices that include an accelerometer, a light detector, and a microphone; a connection for a communications channel; and a computing device that, based on inputs from the input devices, determines whether the event location is in the vicinity of the locator location and, when the event location is in the vicinity, sends a notification via the connection indicating that the event occurred in the vicinity of the locator device. In some embodiments, the computing device generates a score for each input device and generates an overall score and the determination is based on the overall score. In some embodiments, the overall score is based on a weighting of the scores. In some embodiments, a weight for the accelerometer is greater than the weight of the other input devices. In some embodiments, a weight is based on activity that normally occurs within the environment. In some embodiments, the locator device is adapted to be mounted on or in a wall or ceiling within the environment.

In some embodiments, a method performed by a locator device is provided for determining an event location of an event within an environment, the locator device being at a locator location within the environment. For each of a plurality of sounds, the method performs receiving, via a receiver, the sound; comparing the sound to previously received sounds; when the comparing indicates that the received sounds are approaching being in focus, indicating that the event location is near the locator location; and when the comparing indicates that the received sounds may be approaching being in focus, transmitting, via a transmitter, the received sound. The base array located within the environment receives, via a receiver, sounds, generates a time-reversed sound for each sound, and transmits, via a transmitter, the time-reversed sound and wherein a first sound that is received is an event sound generated by the event.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a device for determining an event location of an event within an environment, the method comprising:
   receiving, via a receiver of the device, an event sound generated by the event, the received event sound representing event sound that traveled on multiple paths through the environment from the event location to the receiver;
   generating, by the device, an encoded time-reversed event sound for the received event sound, the encoded time-reversed event sound being encoded with localization information; and
   transmitting, via a transmitter of the device, the encoded time-reversed event sound to a locator that is physically separate from the device,
   wherein the event location is in the vicinity of the locator that and the locator recognizes the localization information in the encoded time-reversed event sound that is received by a receiver of the locator.

2. The method of claim 1 wherein the received event sound has portions that are ordered from a first portion received to a last portion received and the generating of the encoded time-reversed event sound orders the portions so that the last portion received is the first portion of the encoded time-reversed event sound and the first portion received is the last portion of the encoded time-reversed event sound.

3. The method of claim 1 wherein the environment is at least partially indoors.

4. The method of claim 1 wherein the generating and transmitting are in response to determining that an event has been detected.

5. The method of claim 1 wherein the generating, for each of a plurality of locators, generates an encoded time-reversed event sound that is encoded with localization information unique to the locator and the transmitting transmits each encoded time-reversed event sound.

6. The method of claim 1 wherein the locators are located at various locations within the environment.

7. The method of claim 1 wherein the event is a gunshot.

8. The method of claim 1, wherein
   the receiving of an event sound generated by the event is a part of receiving the event sound generated by the event via a plurality of transceivers of a base array of transceivers of the device; and
   the generating of an encoded time-reversed event sound is a part of generating, for each event sound received by a transceiver of the plurality of transceivers during said receiving, a time-reversed event sound for the event sound received by that transceiver.

9. The method of claim 8, wherein the transmitting of the encoded time-reversed event sound comprises transmitting, via a transmitter of the device, the encoded time-reversed event sound to a locator that is physically separate from the device.

10. A method performed by one or more computing devices for determining an event location of an event within an environment based on event sound generated by the event, the method comprising:
accessing a sound map of the environment, the sound map having been generated by transmitting pilot signals from a plurality of locations within the environment, receiving the pilot signals by a base array of transceivers, and, for each transceiver of the base array of transceivers, storing a pilot signal received by that transceiver in association with each of the plurality of locations;
receiving, at each transceiver of the base array of transceivers, the event sound generated by the event;
for each location of the plurality of locations,
for each transceiver of the base array of transceivers, generating a correlation score based on the event sound received by the transceiver and the pilot signal of the sound map for that transceiver and that location; and
generating a combined correlation score for that location based on the correlation scores generated for each of the transceivers of the base array of transceivers for that location;
identifying a location, of the plurality of locations, with the highest combined correlation score; and
indicating that the event location is the location with the highest combined correlation score.

11. The method of claim 10 wherein the environment includes at least a section that is indoors.

12. The method of claim 10 wherein multiple pilot signals are transmitted from each location and each of the multiple pilot signals has a different frequency.

13. The method of claim 10 further comprising transmitting a notification that the event has occurred in the vicinity of the location with the highest combined correlation score.

14. The method of claim 10 further comprising directing the taking of a countermeasure based on the location with the highest combined correlation score.

15. The method of claim 10 wherein the event is a gunshot.

16. A method performed by one or more computing devices for determining an event location of an event within an environment, the method comprising:
for each of a plurality of sounds in sequence with an initial sound being an event sound of the event,
receiving, via transceivers of a base array of transceivers, the sound that traveled on multiple paths through the environment from an originating location to the base array;
for each sound received by a transceiver of the base array of transceivers, generating a time-reversed sound of the sound received by that transceiver; and
transmitting the time-reversed sounds via the transceivers of the base array of transceivers,
wherein a locator device located physically apart from the base array of transceivers at a locator location within the environment receives, via a receiver, the transmitted time-reversed sound and transmits, via a transmitter, the received time-reversed sound until the locator device determines that a received time-reversed sound is sufficiently focused to indicate that the event location is near the locator location.

17. The method of claim 16 wherein the received sound has portions that are ordered from a first portion received to a last portion received and the generating of the time-reversed sound orders the portions so that the last portion received is the first portion of the time-reversed sound and the first portion received is the last portion of the time-reversed sound.

18. The method of claim 16 wherein the environment is at least partially indoors.

19. The method of claim 16 wherein the generating and transmitting are in response to determining that an event has been detected.

20. The method of claim 16 further comprising encoding localization information into the time-reversed sound prior to transmitting the time-reversed sound.

21. The method of claim 16 wherein the event is a gunshot.

22. The method of claim 16 wherein when the location device determines that a received time-reversed sound is sufficiently focused, the location device directs taking a countermeasure.

* * * * *